, 
United States Patent [19]

Smith

[11] Patent Number: 4,846,404

[45] Date of Patent: Jul. 11, 1989

[54] INTERNAL MIX SPRAY GUN CARTRIDGE

[75] Inventor: James E. Smith, St. Petersburg, Fla.

[73] Assignee: Graves Spray Supply, Inc., Clearwater, Fla.

[21] Appl. No.: 150,138

[22] Filed: Jan. 29, 1988

[51] Int. Cl.⁴ .............................. B05B 1/34; B05B 7/04
[52] U.S. Cl. ..................................... 239/400; 239/405;
239/427.5; 239/432; 366/165
[58] Field of Search ............... 239/399, 403, 405, 432, 239/433, 434, 434.5, 400, 427.5; 222/135, 145; 137/896; 366/165, 336, 340

[56] References Cited

U.S. PATENT DOCUMENTS

| | | | |
|---|---|---|---|
| 2,072,281 | 3/1937 | Simonin | 239/432 X |
| 2,149,115 | 2/1939 | De Foe et al. | 239/405 |
| 3,286,997 | 11/1966 | Ledbetter | 239/399 X |
| 3,709,468 | 1/1973 | Ives | |
| 3,727,844 | 4/1973 | Bencic | 239/434.5 X |
| 3,763,876 | 10/1973 | Freeman et al. | 137/111 |
| 3,770,208 | 11/1973 | Mueller | 239/432 X |
| 3,790,030 | 2/1974 | Ives | 222/135 |
| 4,340,311 | 7/1982 | Crandal | 366/336 |

Primary Examiner—Andres Kashnikow
Attorney, Agent, or Firm—Barnes & Thornburg

[57] ABSTRACT

An internal mixing chamber wherein a small amount of secondary fluid is introduced through a circumferential orifice having circumferential rotation and a large amount of primary fluid is introduced as an axial annulus to flow axially through the radially introduced secondary fluid to be mixed therein. The secondary fluid is introduced at lower pressure than the primary fluid and the system is self-balancing.

44 Claims, 2 Drawing Sheets

INTERNAL MIX SPRAY GUN CARTRIDGE

BACKGROUND AND SUMMARY OF THE INVENTION

The present invention relates generally to two component mixers and sprayers and more specifically to an internal mixer and sprayer capable of being used with any two component systems and specifically for polyester foams and resins.

Fiberglass spraying devices, and particularly hand held units, have previously employed a number of different spraying methods in attempts to provide well-mixed, properly shaped fluid spray flows in the most efficient manner possible. Typical fiberglass spraying apparatus supply fluid resin and fluid catalyst to a nozzle for internal or external mixing. With internal mixing, catalyst fluid may typically first be atomized by mixing with air and then directed into the path of the fluid resin at the nozzle interior. After resin-catalyst mixing, the resulting fluid is forced through a common nozzle and directed at the work piece. Internal mixing requires time consuming and expensive cleaning of the nozzle and mix chambers after each use.

With external mixing, both catalyst and resin fluids may typically be forced though separate spray nozzles prior to mixing. These nozzles are directed such that the catalyst and resin spray flows intersect to permit mixing prior to contact with the work piece. If the resin is not atomized prior to spraying, the process is often called "airless." Such external mixed sprayers may not need extensive cleaning after each use, but typically require high fluid pressures. Reinforcing fibers may typically be directed into the mixed spray path of either internal or external mix sprayers to be wetted thereby and carried to the work piece.

The difference between paint spraying and resin spraying has been recognized by many including the state of California which enacted a new rule 1162 directed to polyester resin operations. This rule defines what comes under the statute as well as the special health compliances. Polyester resin spray facilities must be in compliance by July 1, 1988.

For emission control as well as waste purposes, it is desirable to use an internal mix which uses the minimum amount of catalyst or resin. A polyester foam which cures faster and is safer environmentally has been developed by Alpha Corporation. The Alcel polyester foam has a high viscosity in the range of 3600 centipoise compared to 300 centipoise for normal sprayable resins. To produce a foam in the range of 25 to 30 pounds per cubic foot, 3% of blowing agent and 2% of catalysts are added to the Alcel polyester resin. Alcel also offers a filled resin with 40% filler and 60% foam having a viscosity in the range of 120 centipoise. The suggested use is 1.75% of blowing agent and 1.25% catalyst by compound weight. This produces a density in the range of 40 to 50 pounds per cubic foot.

In order to internally mix polyester foams and resins the prior art has used high pressure to force the catalyst and blowing agent into the resin and thus, required substantially long restrictors and surge tanks. The resin and catalyst are introduced at high pressures in opposite directions towards each other to begin the mixing. Similarly, they required static mixers to assure mixing of the catalyst and blowing agent with the resin. Additionally, the catalyst has been provided at four to seven times the pressure of the resin to assure mixing. When the nozzle size or primary material pressures were changed, the system had to be totally rebalanced. Examples of these types of spray guns and systems are shown in U.S. Pats. Nos. 3,709,468 and 3,790,030.

Thus, it is an object of the present invention to provide an improved airless, internal mix sprayer for mixing a small amount of catalyst or secondary fluid to a large amount of primary fluid wherein the mixing balance is self adjusting.

Another object of the present invention is to provide an internal mixer which is capable of operating at reduced supply pressures.

Another object of the present invention is to provide an internal mixer without static mixers.

A still further object of the present invention is to provide an internal mixer for primary and secondary fluids without the need for substantial restriction and surge tanks in the secondary supply lines.

A still even further object of the present invention is to provide an internal mixer which is self-balancing for the changing of spraying nozzle sizes and pressures.

A still even further object of the present invention is to provide a cartridge which is mounted to the face of an existing gun to provide internal mixing of fluids.

These and other objects of the present invention are achieved by introducing a secondary fluid or catalyst radially into a first axial bore and introducing a primary fluid or resin axially to flow through the secondary fluid to be mixed therewith. Preferably the secondary fluid is introduced radially with a circumferential rotation and the primary fluid is introduced as an axial annulus. This allows the system to be self-balancing and the secondary fluid to be introduced at a relative low pressure. The secondary fluid is introduced through a circumferential orifice which is sufficiently small such that there is a pressure change produced by the flowing primary fluid such that the ratio of inlet pressure of the secondary fluid to primary fluid remains substantially constant for variations of flow rates. A substantially short annular restrictor is used in the secondary fluid inlet to prevent surges and act as an accumulator.

The primary fluid is introduced through the interior of a reducing element and then radially to its exterior to form an axial annulus. The reducing element extends from an axial position at which the primary fluid is introduced radially past the axial position at which the secondary fluid is introduced to form a first annular passage. A dispersing chamber is provided axial between the reducing element and the spray nozzle of a substantially larger cross-sectional area than the cross-sectional area of the primary annulus to further mix the primary and secondary fluids by turbulence produced by the change of cross-sectional area.

The secondary fluid from the secondary fluid inlet is introduced tangentially to a second annular passage connected to the circumferential orifice to produce the circumferential rotation of the secondary fluid at the circumferential orifice. The cross-sectional area of the second annular passage is larger at the point of introduction from the inlet than the cross-sectional area where it is connected to the circumferential orifice. The width of the circumferential orifice is smaller than the cross-sectional area of the second annular passage.

An air nozzle is provided adjacent to the spray nozzle for producing an axial flow for maintaining a substantially homogeneous mixture of primary and secondary fluids and/or further shaping of the spray pattern. The primary fluid may be a polyester resin or a foaming polyester resin which is premixed in a mixing chamber before being introduced to the first annular passage where it is mixed with a secondary fluid or catalyst.

The internal mix is formed as a cartridge which can be part of a spray gun or a separate cartridge that can be added to reexisting guns to convert an external mixture to an internal mixer.

Other objects, advantages and novel features of the present invention will become apparent from the. following detailed description of the invention when considered in conjunction with the accompanying drawings.

DETAILED DESCRIPTION OF THE DRAWINGS

Figure 1:
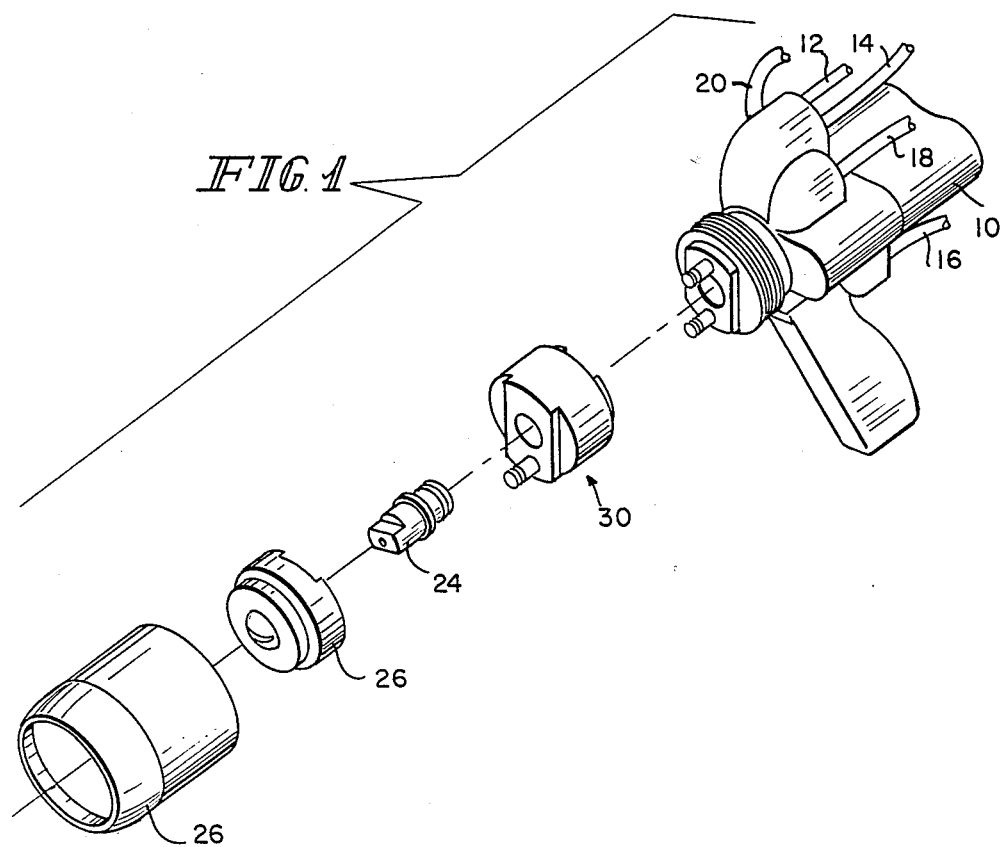
FIG. 1 is an exploded view of the portions of a spray gun including an internal mixing chamber incorporating the principles of the present invention.
Figure 4:
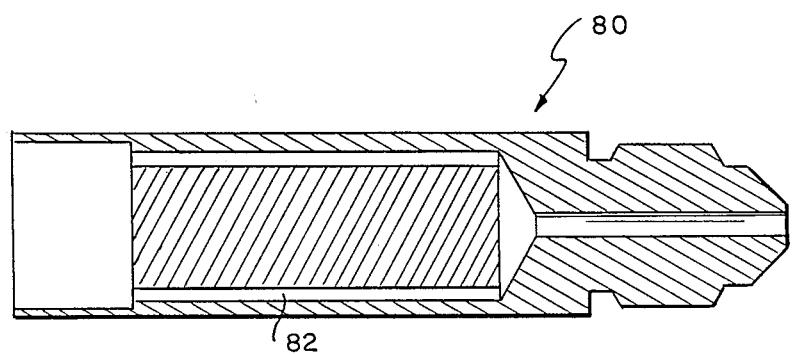
FIG. 4 shows an annular restrictor according to the principles of the present invention.

FIG. 1 shows a gun having a housing 10 with resin inlet 12, blowing agent inlet 14 and catalyst inlet 16, generally shown in the rear thereof. Additionally, for an air assist system, an air inlet 18 is provided and for cleaning, a cleaning or solvent inlet 20 is also shown. A mixed resin/catalyst nozzle 24 and an air assist nozzle portion 26 are secured to the housing 10 by a nut 28 which is threadedly received on the housing 10. The air assist nozzle portion 26 provides air to surround the mixed fluid stream to maintain the mixture confined to a spray pattern and maintain the mixture substantially homogeneous. The air also can perform further shaping. In either case, the air assist prevents the formation of tails or splitting of the spray pattern. The internal mixing cartridge 30 is provided between the housing 10 and the nozzle 22.

Figure 2:
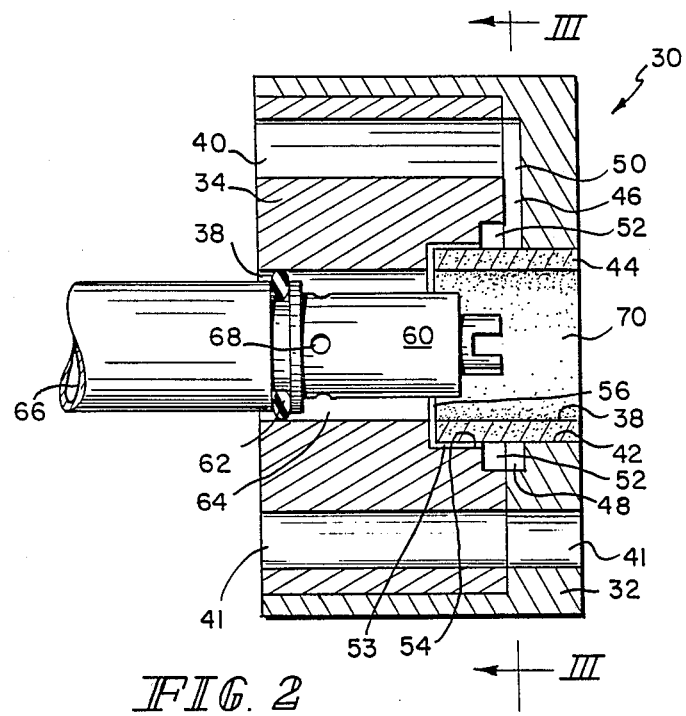
FIG. 2 is a cross-sectional cut-away version of the internal mixing portion of the spray gun of FIG. 1.
Figure 3:
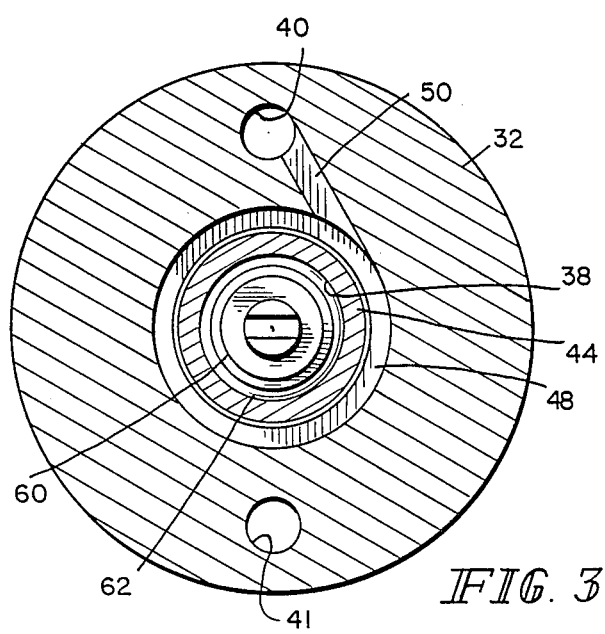
FIG. 3 is a cross-sectional area taken along lines III—III of FIG. 2.

The internal mixing cartridge 30, which is illustrated in detail in FIGS. 2 and 3, includes a generally cylindrical housing member 32 having a bore defining element 34 inserted in a cylindrical recess 36. A first axial bore 38 is provided in the bore defining element 34 which will define the mixing chamber. A second axial bore 40 through bore defining element 34 is connected to the catalyst inlet 16 through the gun. A third axial bore 41, through the bore defining element 34 and housing member 32, connects the air inlet 18 and the air assist nozzle portion 26. In an orifice 42 in the front wall of the housing member 32 is a cylindrical insert 44 which defines an extension of the first bore 38 on its interior and, as will be described later, defines part of the passages of the catalyst on its exterior. The mixed resin/catalyst nozzle portion is received in the interior of insert 44.

As illustrated specifically in FIG. 3, the outer housing 32 has a recess 50 which defines a passage having an annular portion 48 about the exterior of the insert 44 and is connected to the second axial bore 40 connected to the catalyst inlet by a tangential section 50. The tangential entry and reduction of cross-sectional area between the second axial bore 40 and tangential entry 50 and the annular passage 48 produces an increased pressure, circumferential swirling motion to the catalyst.

The bore defining element 34 has a recess 52 and 54 axially adjacent to the housing 32. The recess 52 defines with insert 44 an annular passage of the same cross-section as the annular portion 48 of the passage 46 in the housing 32. The recess 54 with the insert 44 defines an annular passage 53 having has a substantially smaller cross-sectional area than the annular element passages 52 and 48. The annular passage 53 is connected through a circumferential orifice 56 into the first axial bore 38. The circumferential orifice 56 is defined by the separation of the insert 44 from the bore defining element 34. The width of circumferential orifice 56 is smaller than the width or cross-sectional area of passage 53.

The flow of the catalyst from the second axial bore 40 through the tangential entry passage 50 and annular passages 48 andn 52 into a smaller diameter annular portion 53 to orifice 56 provides a radial sheet of catalyst having circumferential rotation. This rotation through the various passages equalizes the fluid pressure and flow across the cross-sectional areas of the reduced passage 53 and the circumferential recess 56. This assures that the catalyst being introduced into the first bore 38 is uniform throughout as well as substantially in balance. Similary, the annular rotation provides additional momentum and forces to assure a proper mixing of the catalyst with the primary fluid flowing in the first bore 38.

A reducing element 60 is provided in the first bore 38 and sealed thereto by an O-ring 62. The reducing element 60 provides an annular area 64 in the first bore 38. The reducing element 60 includes an internal bore 66 into which the primary fluid, being for example resin with a blowing agent mixed in the gun prior to the reducing element 60, is introduced into the annular section 64 of the bore 38 by a plurality of radial orifices 68. Reducing element 60 extends from the radial orifices 68 at which the primary fluid is introduced past the circumferential orifice 56 at which the catalyst is introduced. There are, for example, four radial orifices 68 spaced equally about the circumference of the reducing element 60. Thus, reducing element 60 in combination with the bore 38 provides an axial annulus of the primary fluid flowing through the radial circumferentially rotating sheet of catalyst.

The reducing element 60 does not extend totally through the first bore 38 and thus a portion 70 of the bore 38 has a substantially enlarged cross-sectional area compared to the annulus portion 64 produced by the reducing element 60. This enlarged chamber 70 is a dispersing chamber for further mixing the mixed catalyst and primary fluid by turbulence produced by the change of the cross-sectional area from the annulus section 64 to the section 70 of bore 38. The chamber 70 leads to the nozzle 22 through the primary fluid nozzle portion 24 mounted therein.

The cross-sectional area of the annulus portion 64 which produces the axial flowing primary fluid annulus and the width of the circumferential orifice 56 through which the catalyst is introduced radially are chosen so as to produce a high flow velocity of the primary fluid. This high flow velocity will generate a pressure gradient at the circumferential orifice 56 which will draw the catalyst into the primary fluid flow. As the spray orifice is increased in size, volumetric flow through annular passage 64 is greater and thereby creates an increased flow of velocity past the circumferential orifice 56. Thus, under these conditions, the injection pressure of the catalyst is maintained at approximately 50–75% of the injection pressure of the primary fluid.

It has been found that if the cross-sectional area of the annulus 64 is not maintained sufficiently small, the radially penetrating catalyst will not penetrate and thoroughly mix with the primary fluid flow. Similarly, since the fluids being introduced are orthogonal to each other, they are not operating against each other building up back pressure and therefore requiring greater injection pressures. Additionally, the use of the dispersing chamber 70 further increases the mixing of the resin and the catalyst.

The relationship between the size of the circumferential orifice 56 and the annular primary fluid flow passage 64 and the primary fluid flow rate produces the pressure gradient that provides the self-balancing system. With increase or decrease of volumetric flow, the inlet pressures will also appropriately change, thus keeping a constant ratio of the inlet pressures irrespective of flow rate changes. The circumferential orifice 56, has a cross-sectional width in the range of 0.004 to 0.007 inches. The annular passage 53 has a radial width in the range of 0.008 to 0.010 inches. The radial width of the annular passages 52 and 48 are in the range of 0.070 to 0.075 inches. The axial annulus 64 has a radial width of 0.02 to 0.03 inches. The bore 38 has a diameter in the range of 0.502 to 0.504 inches.

To prevent surges and act as an accumulator, restrictor 80 is provided in the line connected between inlet port 16 for the catalyst and the second axial bore 40. Restrictor 80 provides an annular restriction 82. The radial width of annulus 82 is between 0.004 and 0.005 inches. The overall length of the restrictor 80 is in the range of 1 to 1.5 inches. It should be noted that the restrictor 80 is short compared to the 25 foot restrictor of prior art internal mixing devices. The use of an annular restrictor provides a higher cross-sectional area than would a smaller diametric orifice with equivalent restricting characteristics.

The internal mixing cartridge 30 may be used with any make or model of spray gun and with any nozzle structure. The position of the axial bore 40 for the secondary fluid and the position or even existence of the axial bore 41 for air will be different to match those for each make and model. The nut 28 would be longer than the standard nut to mount the mixing cartridge 30 and the nozzle structure 22 to the housing 10. Thus, an external mixing spray gun can be easily converted into an internal mixing spray gun.

Although the examples contained herein have used resin and catalyst mixtures, the system can also be used preferably for any two component systems for mixing a small amount of a secondary fluid into a primary fluid. The system operates successfully in mixing low viscosity secondary fluids in high viscosity primary fluids.

Thus it can be seen that an improved internal mixing gun has been provided.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An airless, internal mixed sprayer of a small amount of a secondary fluid to a large amount of primary fluid comprising:

housing including a spray nozzle, secondary fluid inlet and primary fluid inlet;
   first axial bore in said housing connected to said nozzle;
   secondary introducing means for introducing said secondary fluid from said secondary fluid inlet into said first bore radially with a circumferential rotation;
   primary introducing means for introducing said primary fluid from said primary fluid inlet into said first bore as an axial annulus to flow through secondary fluid introduced by said secondary introducing means to be mixed therewith; and
   said secondary introducing means including a circumferential orifice on said first bore sufficiently small such that the ratio of inlet pressures of said secondary fluid to primary fluid remains substantially constant for variation of given flow rates.

2. A sprayer according to claim 1, wherein said circumferential orifice has an axial width in the range of 0.004 to 0.007 inches.

3. A sprayer according to claim 2, wherein said axial annulus has a radial width of 0.02 to 0.03 inches.

4. A sprayer according to claim 1, wherein inlet pressure at said secondary fluid inlet can be in the range of 50 to 75% of inlet pressure at said primary fluid inlet.

5. A sprayer according to claim 1, wherein said primary introducing means includes reducing means, in said first bore extending from an axial position at which said primary fluid is introduced past an axial position at which said secondary fluid is introduced, for reducing the cross-sectional area of said first bore and forming a first annular passage in said first bore.

6. A sprayer according to claim 5, wherein said first bore includes a dispersing chamber in said first bore axial between said reducing means and said nozzle of a substantially greater cross-sectional area than said first annular passage, for further mixing said primary and secondary fluids by turbulence produced by the change of cross-sectional area.

7. A sprayer according to claim 5, wherein said reducing means includes a second axial bore connecting said primary fluid inlet to said first annular passage by a plurality of radial bores.

8. An airless, internal mixed sprayer of a small amount of a secondary fluid to a large amount of primary fluid comprising:

housing including a spray nozzle, secondary fluid inlet and primary fluid inlet;
   first axial bore in said housing connected to said nozzle;
   secondary introducing means for introducing said secondary fluid from said secondary fluid inlet into said first bore radial through a circumferential orifice which extends along the circumference of said first bore; and
   primary introducing means for introducing said primary fluid from said primary fluid inlet into said first bore to flow axially through second fluid radially introduced by said secondary introducing means to be mixed therewith.

9. A sprayer according to claim 8, wherein said circumferential orifice has an axial width in the range of 0.004 to 0.007 inches.

10. A sprayer according to claim 9, including a restrictor having an annular passage in said secondary fluid inlet and wherein said restrictor's annular passage has a radial width in the range of 0.004 to 0.005 inches.

11. A sprayer according to claim 10, wherein said restrictor has a length in the range of 1 to 1.5 inches.

12. A sprayer according to claim 8, wherein said primary introducing means includes reducing means, in said first bore extending from an axial position at which said primary fluid is introduced past an axial position at which said secondary fluid is introduced, for reducing the cross-sectional area of said first bore and forming a first annular passage in said first bore.

13. A sprayer according to claim 12, wherein said first annular passage has a radial width of 0.02 to 0.03 inches.

14. A sprayer according to claim 12, wherein a first bore includes a dispersing chamber in said first bore axial between said reducing means and said nozzle of a substantially greater cross-sectional area than said first annular passage, for further mixing said primary and secondary fluids by turbulance produced by the change of cross-sectional area.

15. A sprayer according to claim 12, wherein said reducing means includes a second axial bore connecting said primary fluid inlet to said first annular passage by a plurality of radial bores.

16. A sprayer according to claim 8, wherein said secondary fluid introducing means includes:
   a second axial bore connected to said secondary fluid inlet; and
   a second annular passage connecting said second axial bore and said circumferential orifice, and receiving secondary fluid from said second axial bore tangentially to produce circumferential rotation of said secondary fluid at said circumferential orifice.

17. A sprayer according to claim 16, wherein said second annular passage includes a first section of a first radial cross-sectional area at an axial position at which said second axial bore is connected, and a second section of a second radial cross-sectional area smaller than said first radial cross-sectional area at an axial position of said circumferential orifice.

18. A sprayer according to claim 8, including an air inlet and air nozzle adjacent said spray nozzle for providing an axial flow of air to maintain a substantially homogenous mixture of said primary and secondary fluids and a second axial bore connecting said air inlet and air nozzle.

19. A mixing cartridge to be mounted between primary and secondary fluid outlets and a spray nozzle of an airless, external mixed sprayer of a small amount of secondary fluid to a large amount of primary fluid comprising:
   housing;
   first axial bore in said housing for receiving a nozzle at a first end and having a second end;
   secondary introducing means for introducing said secondary fluid from said secondary fluid outlet into said first bore radially through a circumferential orifice extending along the circumference of said first bore; and
   primary introducing means at said second end for introducing said primary fluid from said primary fluid outlet into said first bore to flow axially through secondary fluid radially introduced by said secondary introducing means to be mixed therewith.

20. A mixing cartridge according to claim 19, wherein said primary introducing means includes annulus means for introducing said primary fluid as an axial annulus.

21. A mixing cartridge according to claim 20, wherein said annulus means maintains said axial annulus through a region in which said second fluid is radially introduced by said circumferential orifice.

22. A mixing cartridge according to claim 19, wherein said primary introducing means includes reducing means, in said first bore extending from an axial position at which said primary fluid is introduced past an axial position at which said secondary fluid is introduced, for reducing the cross-sectional area of said first bore and forming a first annular passage in said first bore.

23. A mixing cartridge according to claim 22, wherein said reducing means includes a second axial bore connecting said primary fluid inlet to said first annular passage by a plurality of radial bores.

24. A sprayer according to claim 22, wherein said first annular passage has a radial width of 0.02 to 0.03 inches and wherein said circumferential orifice has an axial width in the range of 0.004 to 0.007 inches.

25. A sprayer according to claim 19, wherein said secondary introducing means includes:
   a second axial bore to be connected to said secondary fluid outlet; and
   an annular passage connecting said second axial bore and said circumferential orifice, and receiving secondary fluid from said second axial bore tangentially to produce said circumferential rotation of said secondary fluid at said circumferential orifice.

26. A sprayer according to claim 25, wherein said annular passage includes a first section of a first radial cross-sectional area at an axial position at which said second axial bore is connected, and a second section of a second radial cross-sectional area smaller than said first radial cross-sectional area at an axial position of said circumferential orifice.

27. A sprayer according to claim 26, wherein said first section of said second annular passage is axial closer to said first end than said second section of said annular passage.

28. A sprayer according to claim 26, wherein said first section has a radial width in the range of 0.070 to 0.075 inches and said second section has a radial width in the range of 0.008 to 0.010 inches.

29. An airless, internal mixed sprayer of a small amount of a secondary fluid to a large amount of primary fluid comprising:
   housing including a spray nozzle, secondary fluid inlet and primary fluid inlet;
   a restrictor having an annular passage in said second fluid inlet;
   first axial bore in said housing connected to said nozzle;
   secondary introducing means for introducing said secondary fluid from said secondary fluid inlet into said first bore radially with a circumferential rotation; and
   primary introducing means for introducing said primary fluid from said primary fluid inlet into said first bore as an axial annulus to flow through secondary fluid introduced by said secondary introducing means to be mixed therewith.

30. A sprayer according to claim 20, wherein said restrictor's annular passage has a radial width in the range of 0.004 to 0.005 inches.

31. A sprayer according to claim 30, wherein said secondary introducing means includes a circumferential orifice having an axial width in the range of 0.004 to 0.007 inches.

32. A sprayer according to claim 29, wherein said restrictor has a length in the range of 1 to 1.5 inches.

33. An airless, internal mixed sprayer of a small amount of a secondary fluid to a large amount of primary fluid comprising:
   housing including a spray nozzle, secondary fluid inlet and primary fluid inlet;
   first axial bore in said housing connected to said nozzle;
   secondary introducing means for introducing said secondary fluid from said secondary fluid inlet into said first bore radially with a circumferential rotation;
   said secondary fluid introducing means including a second axial bore connected to said secondary fluid inlet, a circumferential orifice into said first bore and a second annular passage connecting said second axial bore and said circumferential orifice, and receiving secondary fluid from said second axial bore tangentially to produce said circumferential rotation of said secondary fluid at said circumferential orifice; and
   primary introducing means for introducing said primary fluid from said primary fluid inlet into said first bore as an axial annulus to flow through secondary fluid introduced by said secondary introducing means to be mixed therewith.

34. A sprayer according to claim 33, wherein said second annular passage includes a first section of a first radial cross-sectional area at an axial position at which said second axial bore is connected, and a second section of a second radial cross-sectional area smaller than said first radial cross-sectional area at an axial position of said circumferential orifice.

35. A sprayer according to claim 34, wherein said first section of said second annular passage is axial closer to said nozzle than said second section of said second annular passage.

36. A sprayer according to claim 34, wherein said first section has a radial width in the range of 0.070 to 0.075 inches and said second section has a radial width in the range of 0.008 to 0.010 inches.

37. A sprayer according to claim 36, wherein said circumferential orifice has an axial width in the range of 0.004 to 0.007 inches.

38. An airless, internal mixed sprayer of a small amount of a secondary fluid to a large amount of primary fluid comprising:
   housing including a spray nozzle, secondary fluid inlet and primary fluid inlet;
   first axial bore in said housing connected to said nozzle;
   secondary introducing means for introducing said secondary fluid from said secondary fluid inlet into said first bore radially with a circumferential rotation;
   primary introducing means for introducing said primary fluid from said primary fluid inlet into said first bore as an axial annulus to flow through secondary fluid introduced by said secondary introducing means to be mixed therewith;
   an air inlet and air nozzle adjacent said spray nozzle for providing an axial flow of air to maintain a substantially homogenous mixture of said primary and secondary fluids; and
   a second axial bore connecting said air inlet and air nozzle.

39. An airless, internal mixed sprayer of a small amount of a catalyst fluid to a large amount of polyester resin fluid comprising:
   housing including a spray nozzle, catalyst fluid inlet and resin fluid inlet;
   first axial bore in said housing connected to said nozzle;
   catalyst introducing means for introducing said catalyst fluid from said catalyst fluid inlet into said first bore radially with a circumferential rotation; and
   resin introducing means for introducing said resin fluid from said resin fluid inlet into said first bore as an axial annulus to flow through catalyst fluid introduced by said catalyst introducing means to be mixed therewith.

40. A sprayer according to claim 39, wherein said resin fluid is a polyester foam mixed with a blowing agent.

41. An airless, internal mixed sprayer of a small amount of a catalyst fluid to a large amount of resin fluid comprising:
   housing including a spray nozzle, catalyst fluid inlet and resin fluid inlet;
   first axial bore in said housing connected to said nozzle;
   catalyst introducing means for introducing said catalyst fluid from said catalyst fluid inlet into said first bore radial through a circumferential orifice; and
   resin introducing means for introducing said resin fluid from said resin fluid inlet into said first bore to flow axially through catalyst fluid introduced by said catalyst introducing means to be mixed therewith.

42. A sprayer according to claim 41, wherein said resin fluid is a polyester foam mixed with a blowing agent.

43. An airless, internal mixed sprayer of a small amount of a secondary fluid to a large amount of primary fluid comprising:
   housing including a spray nozzle, secondary fluid inlet and primary fluid inlet;
   first axial bore in said housing connected to said nozzle;
   secondary introducing means for introducing said secondary fluid from said secondary fluid inlet into said first bore radial through a circumferential orifice;
   primary introducing means for introducing said primary fluid from said primary fluid inlet into said first bore to flow axially through secondary fluid introduced by said secondary introducing means to be mixed therewith; and
   inlet pressure at said secondary fluid inlet can be in the range of 50 to 75% of inlet pressure at said primary fluid inlet.

44. A mixing cartridge to be mounted between resin and catalyst fluid outlets and a spray nozzle of an airless, external mixed sprayer of a small amount of catalyst fluid to a large amount of resin fluid comprising:
   housing;
   first axial bore in said housing for receiving a nozzle at a first end and having a second end;
   catalyst introducing means for introducing said catalyst fluid from said catalyst fluid outlet into said first bore radially through a circumferential orifice; and
   resin introducing means at said second end for introducing said resin fluid from said resin fluid outlet into said first bore to flow axially through catalyst fluid introduced by said catalyst introducing means to be mixed therewith.

* * * * *